Figure 1:
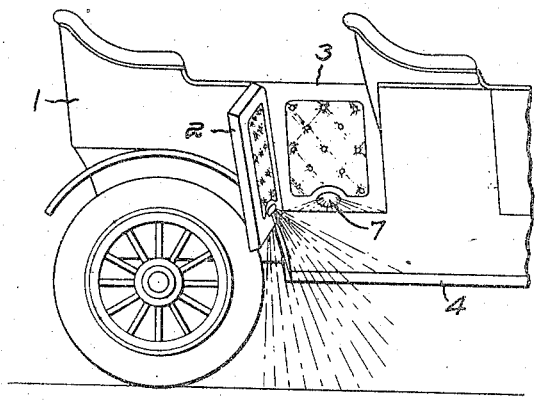

A. C. SCHULZ.
ILLUMINATING DEVICE FOR VEHICLES.
APPLICATION FILED FEB. 12, 1914.

1,248,930. Patented Dec. 4, 1917.

Witnesses:
Carl L. Choate
Horace A. Grossman

Inventor:
Albert C. Schulz,
by Emery Booth Janney Varney
Attys.

UNITED STATES PATENT OFFICE.

ALBERT C. SCHULZ, OF BRIDGEPORT, CONNECTICUT, ASSIGNOR TO THE LOCOMOBILE COMPANY OF AMERICA, OF BRIDGEPORT, CONNECTICUT, A CORPORATION OF WEST VIRGINIA.

ILLUMINATING DEVICE FOR VEHICLES.

1,248,930.  Specification of Letters Patent.  Patented Dec. 4, 1917.

Application filed February 12, 1914. Serial No. 818,409.

*To all whom it may concern:*

Be it known that I, ALBERT C. SCHULZ, a citizen of the United States, and a resident of Bridgeport, county of Fairfield, State of Connecticut, whose post-office address is care of The Locomobile Company of America, Bridgeport, Connecticut, have invented an Improvement in Illuminating Devices for Vehicles, of which the following description, in connection with the accompanying drawings, is a specification, like characters on the drawings representing like parts.

This invention relates to illuminating devices for vehicles and more particularly to devices for illuminating the steps or the floor of a vehicle to assist the occupants in entering or leaving. The invention is herein illustrated specifically as applied to the tonneau of a motor vehicle but it will be evident that it has application to vehicle bodies of other types.

The invention will be best understood by reference to the following description when taken in connection with the accompanying illustration of one specific embodiment thereof while its scope will be more particularly pointed out in the appended claims.

Figure 2:
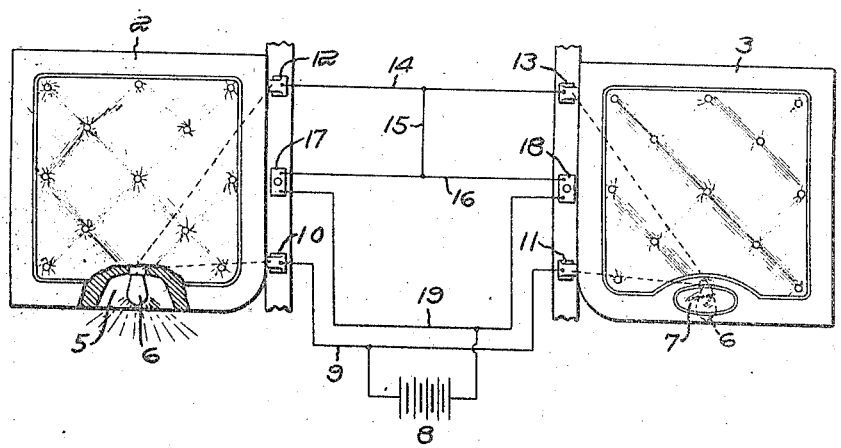

In the drawings:

Figure 1 shows one form of the invention applied to the tonneau of a motor vehicle; and Fig. 2 is a view partly diagrammatic in form showing the arrangement of lighting circuits.

Referring to Fig. 1 and to the embodiment of the invention therein shown, the same is illustrated as applied to the open body or tonneau 1 of a motor vehicle having the oppositely disposed hinged doors 2 and 3 through which entrance may be had to the rear part of the tonneau. On each side of the vehicle body there is provided the usual foot or running board 4 which serves as a step to assist the occupant in entering the vehicle through either one of the hinged doors 2 or 3. In order to illuminate the floor of the vehicle and the upper base of the running board at night when passengers are alighting from or entering the vehicle, illuminating means are provided which, in the described embodiment of the invention, serves automatically on the opening of either door to illuminate both the vehicle floor and the running board.

Referring to the drawings, it will be seen that each of the hinged doors 2 and 3 in its lower edge is provided with a recess 5 in which there is located an illuminating device, herein in the form of an incandescent electric lamp so arranged that, when the door is swung open and the lamp lighted, the light is directed downwardly to illuminate that portion of the running board and the ground, or any other objects lying beneath the door in its immediate vicinity. The said recess 5 is preferably provided with two translucent openings one on the inside of the door and one on the bottom thereof.

The door is also provided with illuminating means for projecting light in a lateral direction either when opened or closed, so that the floor of the vehicle may be illuminated by the illuminating device in the closed door and the running board for all or a substantial portion of its length may be illuminated by light from the open door. A separate lamp or other device may be employed for this purpose, but herein the lamp 6 is provided with means whereby it produces the lateral illumination as well as the downward illumination. This is accomplished by providing a light-transmitting panel 7 in the inner side of each door directly at the side of the lamp 6. By this means the lamp 6 when lighted will illuminate the floor of the tonneau when the door is closed, or will illuminate the running board in front of the door, as well as the ground or other adjacent objects immediately below, when the door is opened. Thus, as shown in Fig. 1, the lamp in the door 3 illuminates the floor of the tonneau and the lamp in the open door 2 illuminates the top of the running board in front of the door and the ground beneath the same.

The lamps may be lighted by any desired means, either automatically or otherwise, but herein I have provided devices whereby on the opening of either door both lamps are automatically lighted. Means for accomplishing this are shown diagrammatically in Fig. 2. I have there shown the vehicle as equipped with a battery 8, one pole of which is connected to the conductor 9, the latter in turn being permanently connected to one terminal of each lamp through the door hinges 10 and 11. The other terminal of each lamp is connected through the respective door hinges 12 ad 13 with a conductor 14 which, through the wires 15 and 16, is connected in multiple to push switches 17 and 18 of the burglar type. The latter are operated by the doors being so arranged that when the doors are closed the switches are opened, but when the doors are opened the switches are closed, the latter condition connecting each lamp terminal through the connections described with the conductor 19 and the opposite pole of the battery. It therefore follows that when either door is opened and the switch 17 or 18, as the case may be, is thereby closed, both lamps are simultaneously energized.

While I have herein shown and described for purposes of illustration one specific form of invention, it is to be understood that the same is susceptible of extensive modification without departing from the spirit thereof.

Claims:

1. The combination with a vehicle body having oppositely arranged hinged doors, of a footboard or step immediately beneath each door and means for illuminating the floor of the body and the space at the said step, said means comprising an electric lamp arranged in a recess in the lower edge of each door, said recess opening downwardly and laterally from the inside of the door, wherefrom the light may be directed downwardly when the door is opened, a light-transmitting panel covering for the recess in the inner side of said door whereby the light may be directed laterally from the door, and means for automatically applying the current to each lamp on the opening of either door whereby the floor of the vehicle is illuminated by the lamp in the closed door and the running board and space thereabout is illuminated by the lamp in the opposite door.

2. The combination with a vehicle body having oppositely hinged doors and a footboard or step beneath each door, of illuminating means carried by each door for directing light both downwardly and laterally, and means for automatically actuating the illuminating devices of both doors when either door is opened.

3. The combination of a vehicle body having oppositely arranged hinged doors, of a footboard or step immediately beneath each door and means for illuminating the floor of said body and the space at the said step, said means comprising an electric lamp arranged in a recess in each door, a translucent opening for each lamp on the inside of each door, each of said lamps being arranged relative to its opening so that light is projected laterally and downwardly through the respective openings, and means for automatically applying the current to each lamp on the opening of either door, whereby the floor of the vehicle is illuminated by the lamp in the closed door and the running board and space thereabout are illuminated by the lamp of the opened door.

4. The combination of a vehicle body having a door, electric illuminating means carried by said door, another electric illuminating means in said body, not swinging with said door but adapted to illumine the floor of said body, and means for automatically actuating both of said illuminating means by opening of said door.

5. The combination of a vehicle body having a door, electric illuminating means carried by said door and adapted to illuminate the space around and beneath said door when said door is open, another electric illuminating means in said body adapted to illuminate the floor of the interior of said body, and means for automatically actuating both of said illuminating means by opening of said door.

6. The combination of a vehicle body having a hinged door, a foot board or step immediately beneath said door, an electric lamp arranged within a recess in the bottom of the door and having a light transmitting opening both at the under side of the door and the inside of the door arranged to project the light both downwardly and laterally through the respective openings, means for automatically applying current to the lamp on the opening of the door upon its hinges, whereby the foot board or step and the space thereabout immediately adjacent the door is illuminated by the light through the said openings when the door is swung open and over the foot board.

In testimony whereof, I have signed my name to this specification, in the presence of two subscribing witnesses.

ALBERT C. SCHULZ.

Witnesses:
RICHARD J. KELLEY,
O. SANDBERG.